United States Patent [19]

Shibata et al.

[11] Patent Number: 5,519,677
[45] Date of Patent: May 21, 1996

[54] BIAXIAL ACTUATOR FOR DRIVING AN OBJECTIVE LENS IN BOTH FOCUSING AND TRACKING DIRECTIONS

[75] Inventors: Keiichi Shibata, Tokyo; Takatoshi Hirata, Kanagawa; Masashi Matsumura, Chiba, all of Japan

[73] Assignee: Sony Corporation, Tokyo, Japan

[21] Appl. No.: 214,697

[22] Filed: Mar. 18, 1994

[30] Foreign Application Priority Data

Mar. 22, 1993 [JP] Japan .................................. 5-086830

[51] Int. Cl.$^6$ ................................................ B11B 7/095
[52] U.S. Cl. .................................. 369/44.16; 369/44.21
[58] Field of Search ........................... 369/44.14, 44.15, 369/44.16, 44.21, 44.22; 359/814, 824

[56] References Cited

U.S. PATENT DOCUMENTS

| | | | |
|---|---|---|---|
| 4,766,583 | 8/1988 | Oinoue et al. | 369/44.16 |
| 5,050,964 | 9/1991 | Mori | 369/44.16 X |
| 5,453,881 | 9/1995 | Suzuki | 369/44.21 |

FOREIGN PATENT DOCUMENTS

| | | |
|---|---|---|
| 0419097 | 3/1991 | European Pat. Off. . |
| 0458027 | 11/1991 | European Pat. Off. . |
| 3-122830 | 5/1991 | Japan .................................. 369/44.16 |

OTHER PUBLICATIONS

EPO Search Report.
Patent Abstract of Japan, vol. 14, No. 321, Oct. 7, 1990.
Patent Abstract of Japan, vol. 11, No. 144, Dec. 5, 1987.
Patent Abstract of Japan; vol. 9, No. 137, Jun. 12, 1985.

*Primary Examiner*—Aristotelis Psitos
*Assistant Examiner*—Thang V. Tran
*Attorney, Agent, or Firm*—Ronald P. Kananen

[57] ABSTRACT

An objective lens driving biaxial actuator for driving an objective lens in both a focusing direction and a tracking direction with respect to a recording medium. The biaxial actuator comprises: a movable portion for holding the objective lens; an elastic member having its one end attached to the movable portion for movably supporting the movable portion; a stationary portion fixing the other end of the elastic member; and a balancer disposed at the side of the stationary portion with respect to the objective lens and carried on the movable portion at such a distance that its clearance from the stationary portion may restrict the deformation of the elastic member within an elastic limit. A hinge is interposed between the elastic member and the movable portion for moving the objective lens in the tracking direction.

14 Claims, 5 Drawing Sheets

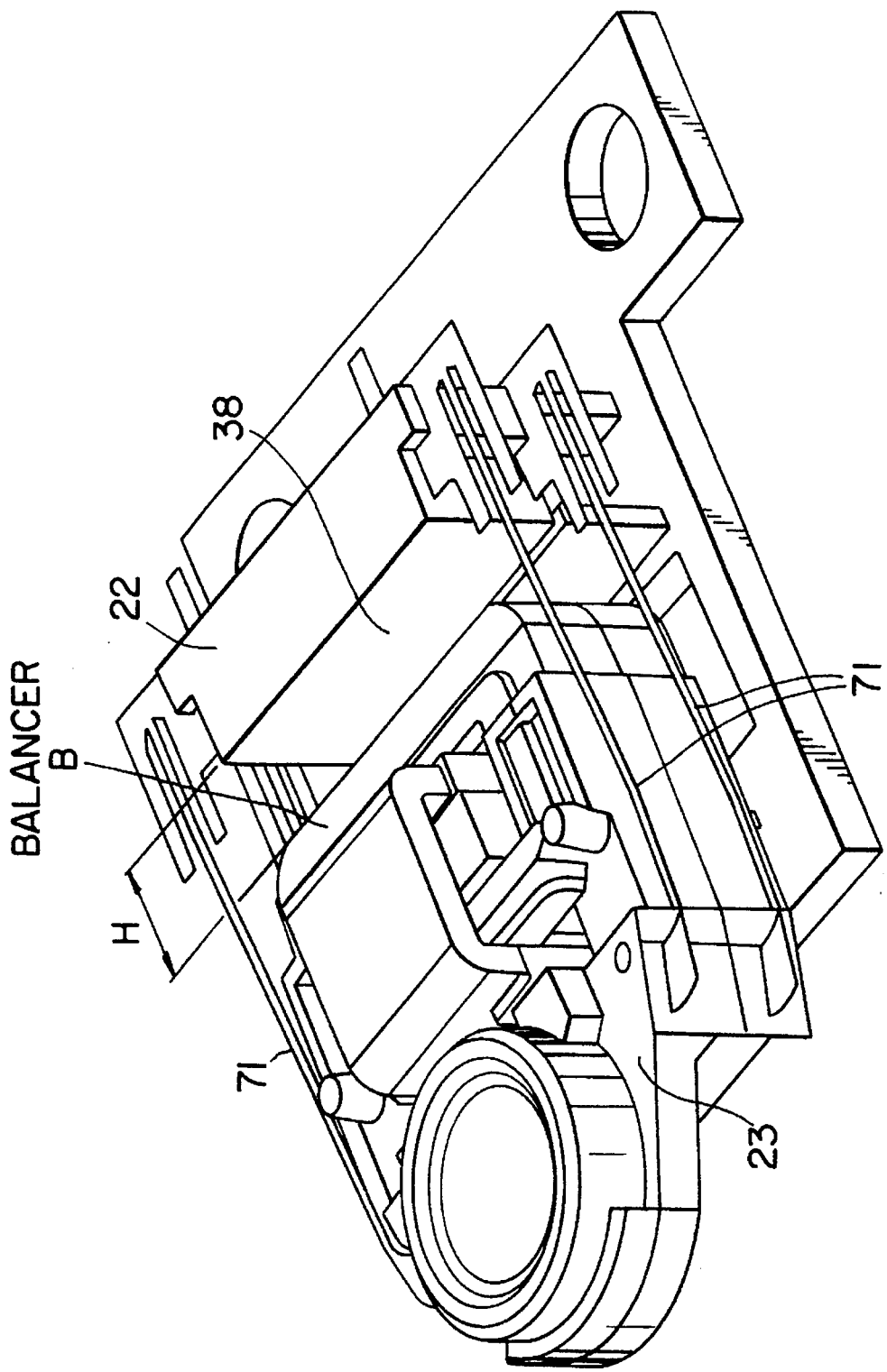

BIAXIAL ACTUATOR FOR DRIVING AN OBJECTIVE LENS IN BOTH FOCUSING AND TRACKING DIRECTIONS

BACKGROUND OF THE INVENTION

1. Field of the Invention

The present invention relates to a biaxial actuator for operating a movable portion, which includes an objective lens for focusing a beam of light coming from a light source such as a semiconductor laser on the signal surface of an optical disk, in both a focusing direction and a tracking direction.

2. Description of the Related Art

In the prior art, an optical pick up device has been used as a means for reading out an information signal recorded on an optical disk or writing information on the disk by applying a beam of light to the signal surface of the disk which is being driven by a disk drive device.

This optical pickup device is equipped with a biaxial actuator. In the biaxial actuator, the beam of light emanating from a light source such as a semiconductor laser can be applied in focus to the signal surface of the optical disk precisely along the recording track, by displacing the objective lens, which is used for focusing the beam of light on the signal surface of the disk, in biaxial directions of the focusing direction and the tracking direction by a magnetic drive force.

This biaxial actuator of the prior art has a structure, as shown in FIGS. 1 and 2.

In FIGS. 1 and 2, the biaxial actuator is equipped with a movable portion 1 and a stationary portion 2. The movable portion 1 is so supported with respect to the stationary portion 2 by an elastic support mechanism, which is interposed between the two portions 1 and 2, as to follow a fluctuation due to the motion of the optical disk. The movable portion 1 is equipped with an objective lens L called the "read lens" and a lens holder 3 supporting the objective lens L.

The lens holder 3 of the movable portion 1 is supported by a leaf spring 4 for controlling the focusing operation of the elastic support mechanism. Specifically, the lens holder 3 is supported by one end of the leaf spring 4 through a tracking hinge 6 of the elastic support mechanism. The other end of the leaf spring 4 is fixed to a yoke 5 of the stationary portion 2.

In case the movable portion 1 is subjected to a tracking operation in the tracking direction TR, it moves on the pin of the tracking hinge 6. In case, on the other hand, the movable portion 1 is subjected to a focusing operation in the focusing direction FC, it is moved by the elastic deformation of the leaf spring 4.

Moreover, the movable portion 1 carries a balancer B thereon. This balancer B is provided for balancing the movable portion 1 in weight with the objective lens L in the two focusing and tracking directions.

However, the biaxial actuator of the prior art, as shown in FIGS. 1 and 2, may receive an impact in the direction of arrow X from a fixed location FL, if it is hit by the fixed location FL when assembled into an optical pickup device, for example. In this case, the leaf spring 4 will be buckled by that impact. This buckling is caused by the fact that a large clearance E exists between the balancer B and a stopper S of the yoke 5. Specifically, the movable portion moves beyond its working range and its elastic limit in the clearance E, if the impact in the direction X is applied thereto, so that the leaf spring is buckled.

As used in this context, the term "elastic limit" means the working range in which the focus supporting members may return to their original form after the focus supporting members are displaced by shock. When the actuator of the objective lens is dropped, the focus supporting members are moved. At this time, if the focus supporting members are moved or displaced to beyond their working range (or elastic limit) which is determined by the material of the focus supporting members, the focus supporting members cannot return to their original shape. Thus, the focus supporting members change their shape.

SUMMARY OF THE INVENTION

The present invention has been made to overcome the above-specified problems and has an object to provide a highly reliable, biaxial actuator which can have its anti-impact property improved, when the movable portion is subjected to not only the focusing operation but also the tracking operation, to suppress the deformation of an elastic member for the focusing operation within an elastic limit in which the elastic member can return to its original shape.

According to the present invention, this object can be achieved by an objective lens driving biaxial actuator for driving an objective lens in both a focusing direction and a tracking direction with respect to a recording medium, which comprises: a movable portion for holding the objective lens; an elastic member having its one end attached to the movable portion for supporting the movable portion movably; a stationary portion fixing the other end of the elastic member; and a balancer disposed at the side of the stationary portion with respect to the objective lens and carried on the movable portion at such a distance that its clearance from the stationary portion may restrict the deformation of the elastic member within its elastic limit.

According to the present invention, the elastic member may preferably be exemplified by a leaf spring for moving the objective lens in the focusing direction.

Preferably, a hinge may be interposed between the elastic member and the movable portion for moving the objective lens in the tracking direction.

Preferably, the face of the balancer opposed to the stationary portion may be curved to establish such a distance that the closest position of the opposed face to the stationary portion when the movable portion turns in the tracking direction restricts the deformation of the leaf spring within its elastic limit.

Preferably, the face of the balancer opposed to the stationary portion may also be curved at a substantially equal distance from the pin of the hinge.

According to the constructions described above, the predetermined clearance is held, even if the movable portion is turned on the hinge when it is subjected to the tracking operation, so that the deformation of the elastic member can be restricted within its elastic limit by the held clearance.

BRIEF DESCRIPTION OF THE DRAWINGS

FIG. 5 is a diagram showing a second embodiment of the biaxial actuator of the present invention.

DESCRIPTION OF THE PREFERRED EMBODIMENTS

The present invention will be described in detail in connection with its preferred embodiments with reference to the accompanying drawings.

The embodiments described are the preferred specific ones of the present invention so that a variety of technically preferable limitations are added. Despite these additions, however, the present invention should not have its scope restricted to those modes unless otherwise specified in the following description.

Figure 1:
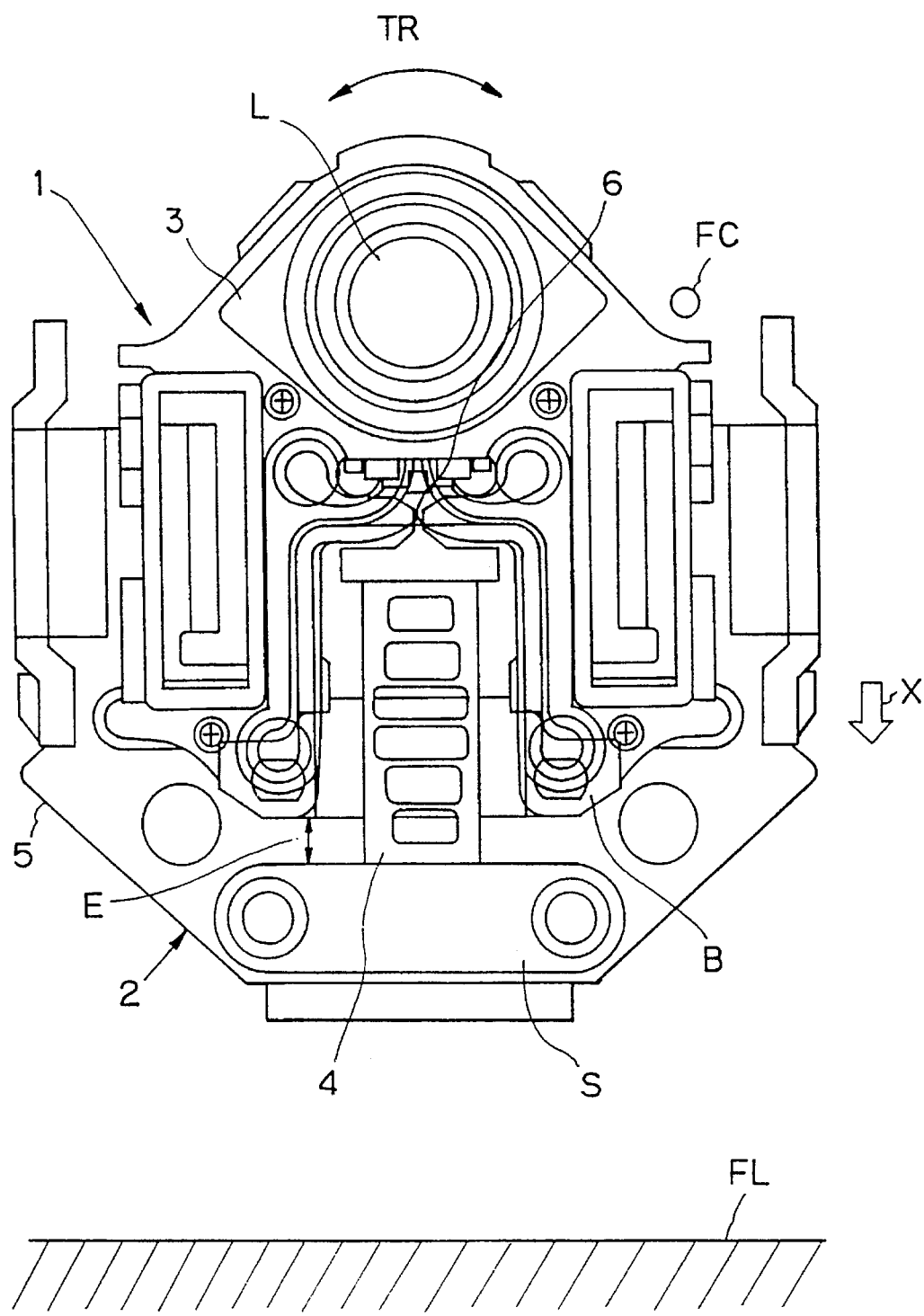
FIG. 1 is a diagram showing the biaxial actuator of the prior art.
Figure 2:
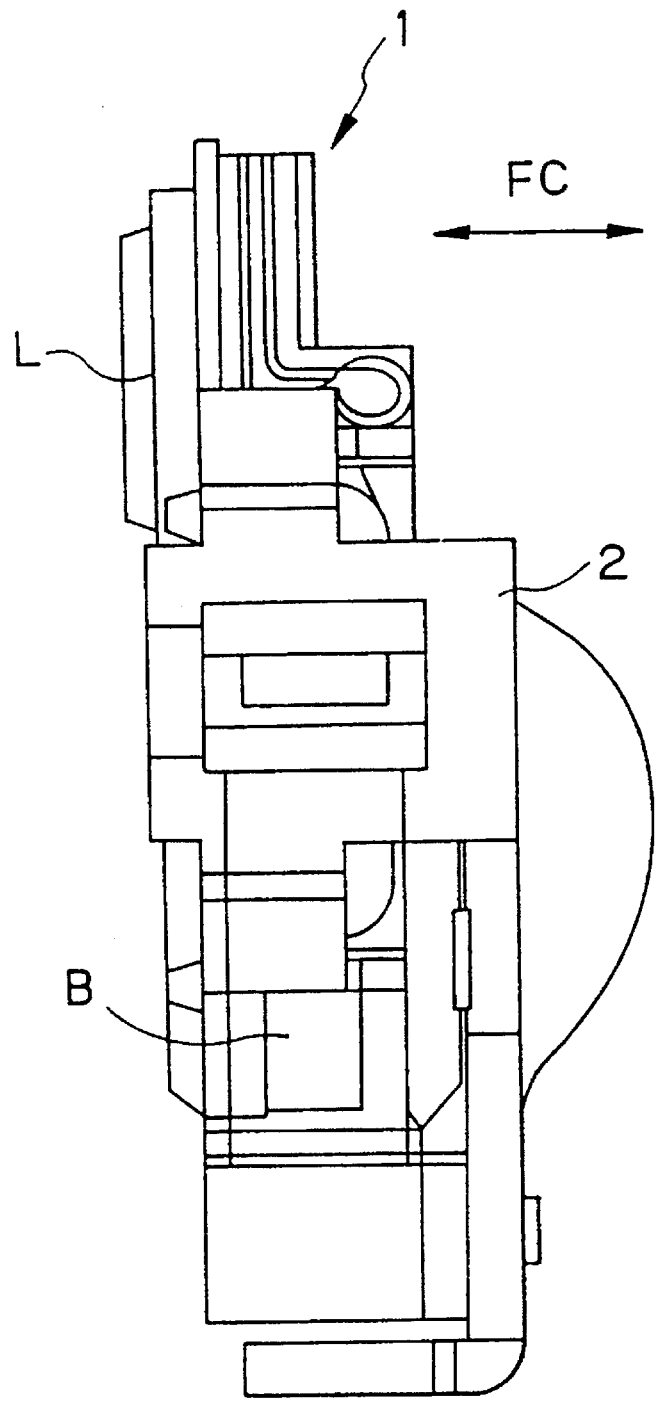
FIG. 2 is a side elevation showing the biaxial actuator of the prior art shown in FIG. 1.
Figure 3:
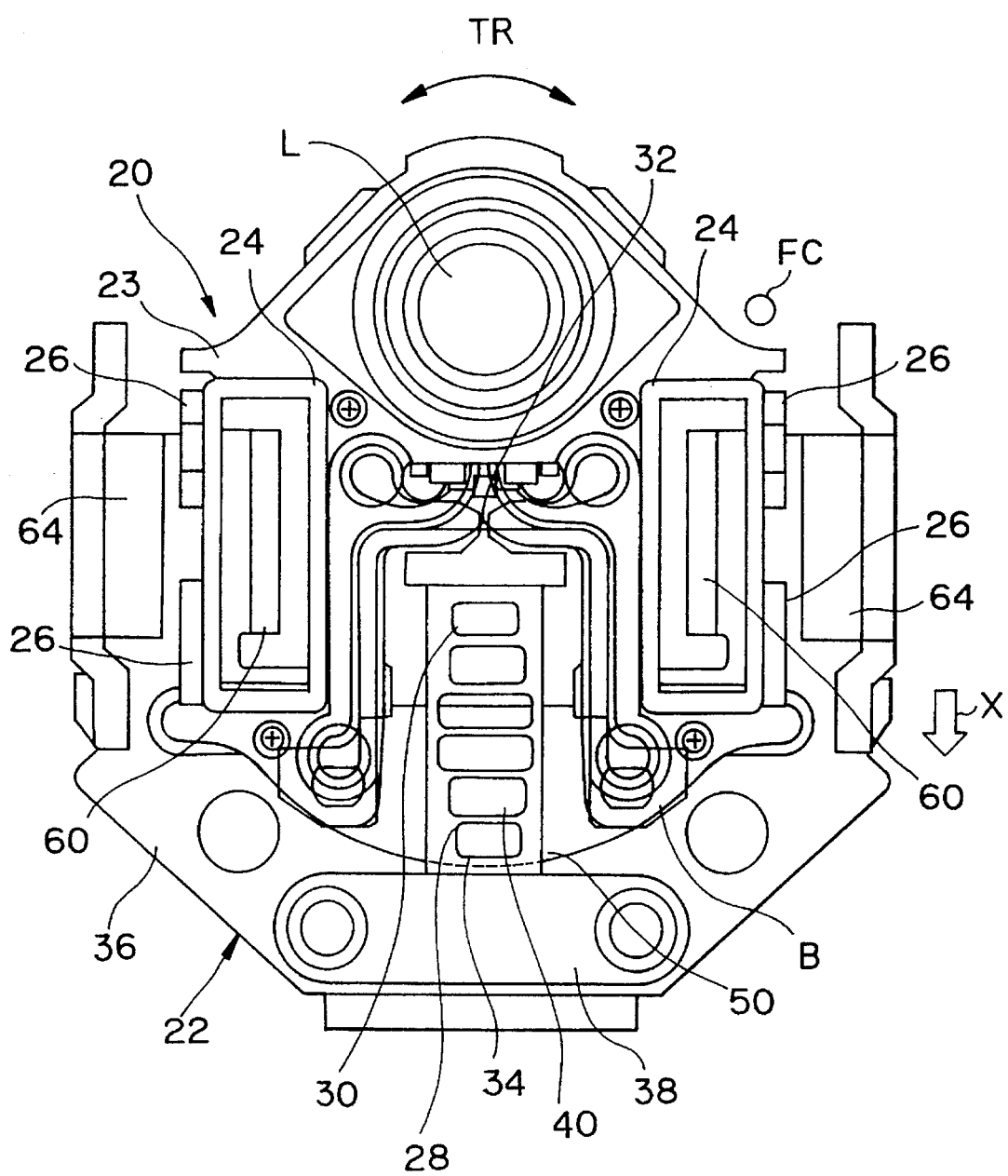
FIG. 3 is a diagram showing a preferred embodiment of a biaxial actuator according to the present invention.

In FIG. 3, the biaxial actuator is constructed to include a movable portion 20 and a stationary portion 22. Between these movable and stationary portions 20 and 22, There is interposed an elastic support mechanism. This elastic support mechanism is provided for causing the movable portion 20 to follow a fluctuation due to the rotation of the optical disk and is composed of a leaf spring 28 for the focusing operation and a hinge 32 for the tracking operation.

The movable portion 20 is composed of a lens holder 23, an objective lens L supported by the lens holder 23, a balancer B, a focusing coil 24 and a tracking coil 26. In short, the movable portion 20 of the biaxial actuator of FIG. 3 is the so-called "moving coil" type.

The balancer B is a weight for adjusting the weight balance with the objective lens L in the movable portion 20 in both the focusing direction and the tracking direction. The movable portion 20 is mounted on a yoke 36 of the stationary portion 22 through the leaf spring 28 for the focusing operation.

The hinge 32 for the tracking operation is interposed between the lens holder 23 of the movable potation 20 and one end 30 of the leaf spring 28 for the focusing operation. This leaf spring 28 has its other end 34 fixed with respect to the yoke 36 and a stopper 38 of the stationary portion 22.

The leaf spring 28 for the focusing operation is exemplified by two leaf springs which are arranged at this and opposite sides with respect to the sheet surface of FIG. 3. The leaf spring 28 is suitably punched at 40. The spring constant of the leaf spring 28 can be changed either by adjusting the ratio of the area of the punched holes 40 or by changing the material and/or thickness of the leaf spring 28.

Figure 4:
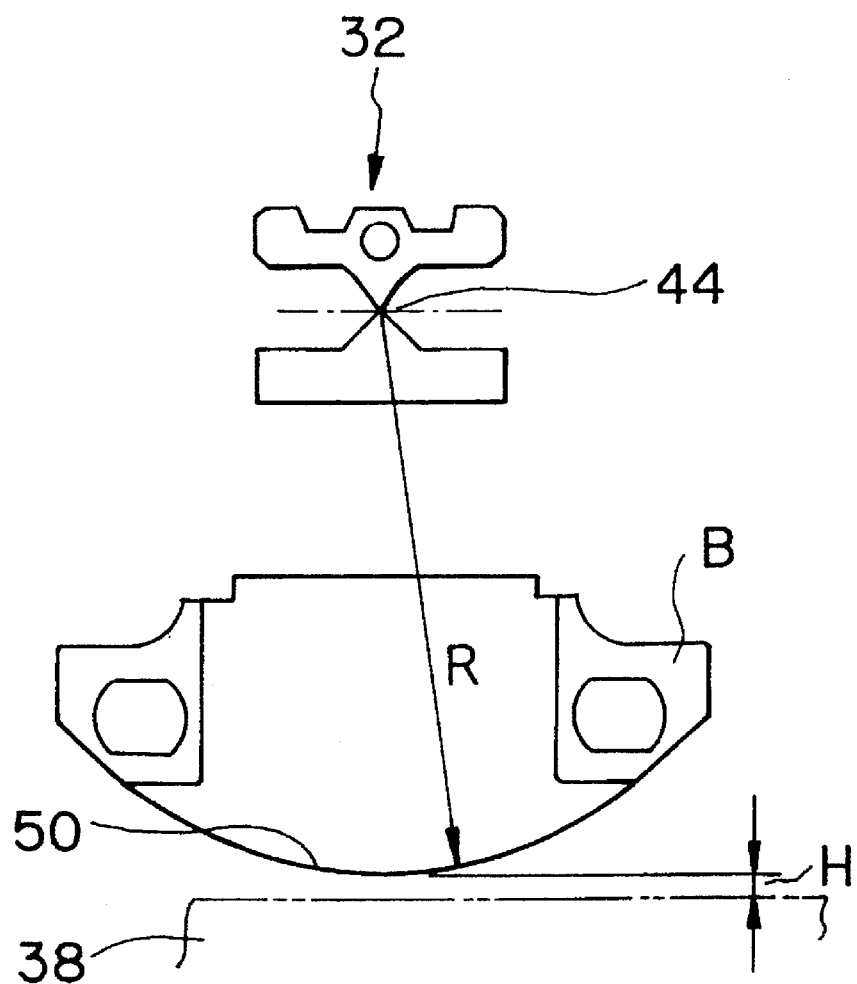
FIG. 4 is a diagram showing a hinge for tracking the biaxial actuator of FIG. 3, together with a balancer and a stopper.

What is especially important for this embodiment resides in that the balancer B has its curved portion 50 formed, as shown in FIG. 4, on the center of a tracking turn of the hinge 32 for the tracking operation.

Specifically, the curved portion 50 of the balancer B extends along a portion of a circumference around the turning center 44 at a distance R. The curved portion 50 has a function to provide a stop surface to abut against the stopper 38 when an impact in the direction of arrow X is applied to the movable portion 20 of FIG. 3.

Thus, the curved stopper surface 50 is made to form part of the circumference on the turning center 44 of the tracking operation hinge 32, so that the clearance between the stopper 38 and the curved portion 50 of the balancer B is held at a constant value H no matter what tracking position the movable portion 20 might take when this movable portion 20 turns in the tracking direction, as indicated by TR.

Reverting to FIG. 3, the focusing coil 24 of the movable portion 20 surrounds a yoke 60. This yoke 60 is integrated with the yoke 36 of the stationary portion 22. On the other hand, the tracking coil 26 is attached to the focusing coil 24. A magnet 64 is also integrally fixed on the yoke 36 of the stationary portion 22.

When the focusing coil 24 is energized, the objective lens L can be moved in the focusing direction, as indicated by FC. When the tracking coil 26 is energized, on the other hand, the objective lens L can be turned on the center 44 of the tracking operation hinge 32 in the tracking direction TR.

The following operations can be achieved by the embodiment described above.

Let the case be considered, in which an impact is applied to the biaxial actuator of FIG. 3 if this actuator is dropped or hit in the direction X when it is assembled into an optical pickup device. In this case, the movable portion 20 will move downward of FIG. 3 with respect to the stationary portion 22. Then, a force is established in the focusing operation leaf spring 28 to bring the curved portion 50 of the balancer B downward for a distance corresponding to the clearance H into abutment against the stopper 38.

In short, the distance for which the curved portion 50 of the balancer B moves in the direction X of FIG. 3 is the clearance H, as indicated in FIG. 4. This moving distance is set to such a value that the deformation of the focusing operation leaf spring 28 is restricted within the elastic limit determined by the material, shape and so on of that leaf spring. This prevents the focusing operation leaf spring 28 from being buckled.

Let another case be considered, in which an impact is applied to the movable portion 20 while this portion 20 is displaced along the tracking direction TR by the tracking operation. In this case, too, the focusing operation leaf spring 28 is prevented from being buckled, no matter what tracking operation position the movable portion 20 might take. This is because the curved portion 50 of the balancer B of FIG. 4 forms part of the circumference, as taken on the center 44 of the tracking operation hinge 32, so that the clearance H between the curved portion 50 and the stopper surface 38 is held at the constant value. As a result, the leaf spring 28 will not be buckled even if the movable portion 20 is subjected to the focusing operation and/or the tracking operation with respect to the stationary portion 22.

Thus, according to the present invention, the clearance (or gap) H between the face of the stopper 38 or the root face of the focusing operation leaf spring 28 acting as the suspension of the elastic support mechanism and the curved portion 50 of the balancer B is set within the elastic limit of the leaf spring 28, so that the biaxial actuator can be prevented from becoming unusable due to the buckling of the leaf spring 28.

FIG. 5 shows a second embodiment of the present invention.

In this embodiment, the biaxial actuator is equipped with four leaf springs 71, which have their one-side ends fixed on the lens holder 23 and their other ends fixed on the stopper 38. The lens holder 23 is so supported by the four leaf springs 71 as to move in both the focusing direction and the tracking direction. Like the first embodiment, moreover, the clearance H between the balancer B and the stationary portion is set to such a distance that the deformation of the leaf springs may fall within the elastic limit. In this embodiment, however, the face of the balancer B opposed to the stationary portion need not be curved because the movement of the movable portion in the tracking direction is not the turning motion but a parallel movement with respect to the stopper surface.

Incidentally, the present invention should not be limited to the foregoing embodiments.

For example, the shape of the focusing operation leaf spring 28 is not limited to that of the embodiment of FIG. 3. In FIG. 3, moreover, there is presented the movable portion 20 of the moving coil type, in which the focusing coil and the tracking oil 26 are disposed at the side of the movable portion 20. Despite this presentation, however, the present invention can also be applied to the biaxial actuator of the so-called "moving magnet" type, in which the magnet is mounted on the movable portion.

Still further, the curved shape of the balancer B should not be limited to a portion of the circumference which is established on the turning center 44 of the tracking operation hinge 32, as shown in FIG. 4. For example, the curved surface may be located at such a distance that the closest position of the opposed face to the stationary portion 22 when the movable portion 20 turns in the tracking direction restricts the deformation of the leaf spring 28 within the elastic limit.

What is claimed is:

1. An objective lens driving biaxial actuator for driving an objective lens in both a focusing direction and a tracking direction with respect to a recording medium, comprising:

a movable portion for holding said objective lens;

an elastic member having its one end attached to said movable portion for movably supporting said movable portion;

a stationary portion fixing the other end of said elastic member; and a balancer disposed at a side of said stationary portion at which said objective lens is located and carried on said movable portion at such a distance that a clearance of said balancer from said stationary portion is defined so that the deformation of said elastic member is restricted to within its elastic limit upon impact to said movable portion or said balancer.

2. An objective lens driving biaxial actuator according to claim 1, wherein said elastic member includes a leaf spring for moving said objective lens in the focusing direction, said elastic limit being determined by said leaf spring.

3. An objective lens driving biaxial actuator according to claim 2, further comprising:

a hinge interposed between said leaf spring and said movable portion for moving said objective lens in the tracking direction.

4. An objective lens driving biaxial actuator according to claim 3, wherein a face of said balancer opposed to said stationary portion is curved to establish such a distance that the closest position of said opposed face to said stationary portion when said movable portion turns in a tracking direction restricts the deformation of said leaf spring within its elastic limit.

5. An objective lens driving biaxial actuator according to claim 4, wherein the face of said balancer opposed to said stationary portion is curved at a substantially equal distance from a pin of said hinge defining a center of said tracking direction.

6. An objective lens driving biaxial actuator according to claim 3 wherein said movable portion includes a lens holder, an objective lens supported by the lens holder, said balancer, a focusing coil, and a tracking coil.

7. An objective lens driving biaxial actuator according to claim 6 wherein said movable portion is mounted on a yoke of said stationary portion through said elastic member for focusing in said focusing direction.

8. An objective lens driving biaxial actuator according to claim 7, wherein said hinge is interposed between the lens holder of the movable portion and one end of the leaf spring for focusing in said focusing direction, wherein the leaf spring has its other end fixed with respect to the yoke and the stopper of the stationary portion.

9. An objective lens driving biaxial actuator according to claim 3, wherein said balancer has a curved portion formed on a center of a tracking turn of the hinge for a tracking operation and which extends along a portion of a circumference at a distance from said center which defines said clearance, said curved portion providing a stop surface to abut against a stopper on said stationary portion when an impact is applied to the actuator.

10. An objective lens driving biaxial actual according to claim 9 wherein said clearance between the stopper and the curved portion of the balancer is maintained at a constant value at any tracking position in said tracking operation when said movable portion turns in the tracking operation.

11. An objective lens driving biaxial actuator according to claim 2, wherein said leaf spring for focusing in said focusing direction defines at least one opening so that the spring constant of the leaf spring can be changed either by adjusting the ratio of the area of the opening or the thickness of the leaf spring, or both.

12. An objective lens driving biaxial actuator according to claim 1, wherein said elastic member includes four leaf springs for moving said objective lens in both a focusing direction and a tracking direction.

13. A biaxial actuator for driving an objective lens in a focusing direction and a tracking direction with respect to a recording medium, comprising:

a stationary portion having a stopper member;

a movable portion for holding said objective lens;

an elastic support mechanism interposed between said stationary portion and said movable portion and including a leaf spring for movement in said focusing direction and a hinge for movement in said tracking direction interposed between said movable portion and an end of the leaf spring, another end of said leaf spring connected to said stationary portion; and a balancer secured intermediate said hinge and said stopper member and carried on said movable portion, said balancer having a surface located at a distance from said stopper member defined by a clearance which restricts deformation of said leaf spring to within its elastic limit upon impact on said biaxial actuator.

14. A biaxial actuator as set forth in claim 13 wherein said clearance is defined by a curved portion of said balancer determined by a distance from a turning center of said hinge for said tracking direction.

* * * * *